United States Patent [19]
Tateishi et al.

[11] 3,856,831
[45] Dec. 24, 1974

[54] PROCESS FOR PREPARING HARD BUTTER

[75] Inventors: Teizabro Tateishi, Toyonaka; Koichi Murase, Izumi; Yukio Iwanaga, Tottori, all of Japan

[73] Assignee: Fuji Oil Company Ltd., Osaka-shi, Japan

[22] Filed: July 12, 1973

[21] Appl. No.: 378,593

[52] U.S. Cl. .............................. 260/409, 252/472
[51] Int. Cl. ............................................. C11c 3/12
[58] Field of Search ................................... 260/409

[56] References Cited
UNITED STATES PATENTS

| | | | |
|---|---|---|---|
| 2,975,063 | 3/1961 | Prenton et al. | 260/409 |
| 3,444,221 | 5/1969 | Voeste et al. | 260/409 |
| 3,687,989 | 8/1972 | Baltes | 260/409 |

Primary Examiner—Elbert L. Roberts
Attorney, Agent, or Firm—Michael, Best & Friedrich

[57] ABSTRACT

Hard butters which are particularly suitable for use as cocoa butter substitutes and which can be used in the manufacture of confectioneries without tempering are prepared by hydrogenating a fat or oil having an iodine value within the range of 60 to 78 and a total content of linoleic and linolenic acids of less than 17 weight percent with a nickel catalyst containing 6 to 21 parts by weight sulfur per 100 parts nickel.

14 Claims, 1 Drawing Figure

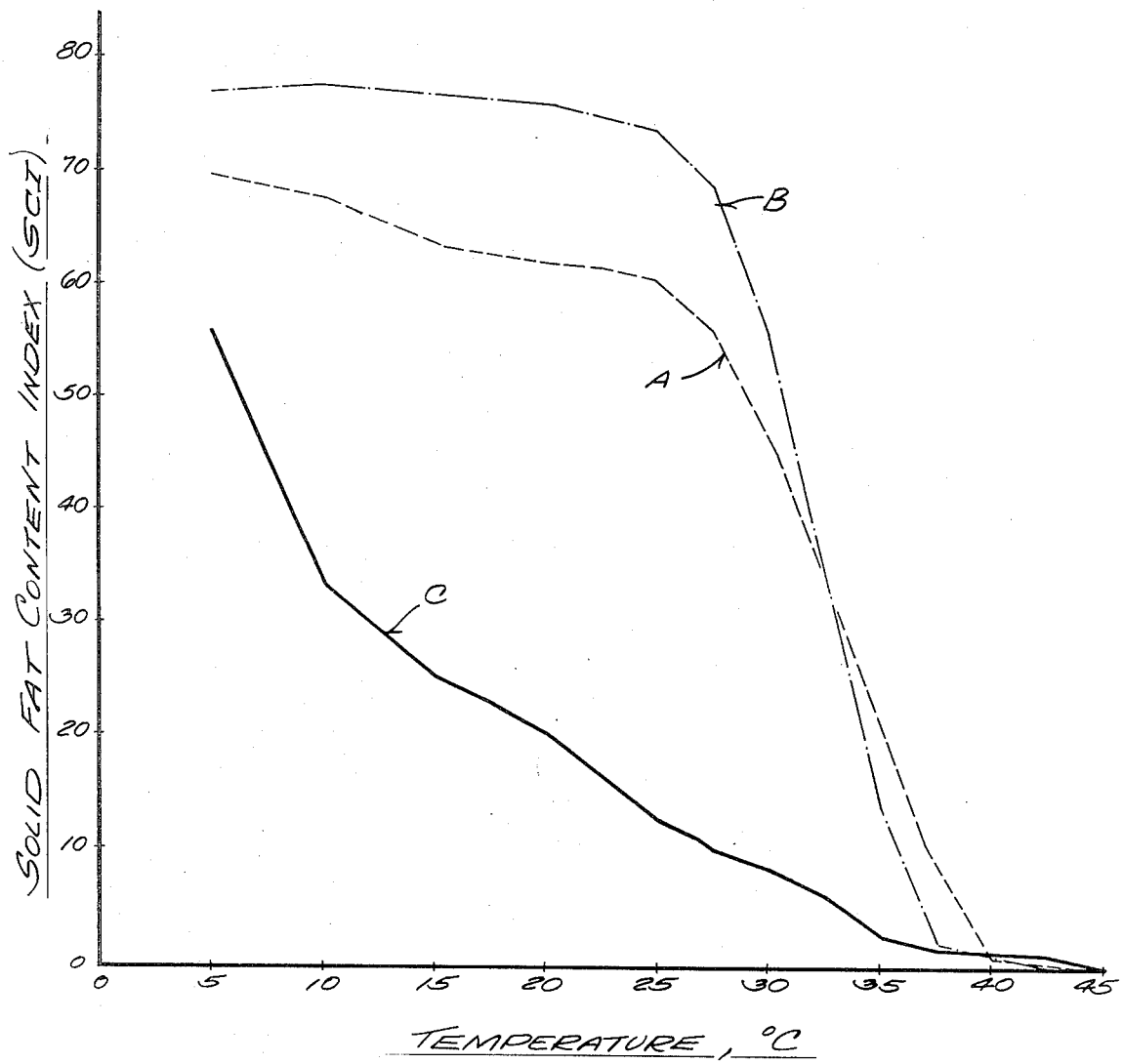

PROCESS FOR PREPARING HARD BUTTER

BACKGROUND OF THE INVENTION

This invention relates to a process for preparing hard butters which are particularly adaptable for use as cocoa butter substitutes.

So-called hard butters or confectionery fats are used in the manufacture of confectioneries or the like because of their unique characteristics of remaining relatively hard and brittle up to temperatures only a few degrees below their melting point but melting completely and evenly in the mouth. These hard butters are particularly useful as substitutes for cocoa butters or in admixture with cocoa butters in the manufacture of chocolate, chocolate-flavored coatings or the like. When so used, the products made therefrom should have a long lasting high gloss and be resistant to fat bloom during storage. In order to obtain these highly desirable properties, the manufacturing process typically includes a tempering step which can be quite expensive and time consuming.

Heretofore, numerous processes have been proposed for preparing hard butters or confectionery fats; however, these prior processes and/or the hard butters produced thereby have one or more shortcomings. The prior processes typically employ one or more unit processes, such as hydrogenation, fractionation and/or interesterification.

In one prior process, hard butters are prepared by fractionating a natural fat, such as a shea butter and illipe butter, which have fatty acid and triglyceride compositions similar to cocoa butter. Although producing hard butters having acceptable properties, this process is quite expensive because of the poor product yield. Other hard butters prepared from so-called "lauric oils," such as coconut oil, have some good physical characteristic but generate an unpleasant soapy flavor.

In another prior process, oils of triglycerides consisting essentially of $C_{16}$ and/or $C_{18}$ fatty acid are interesterified with oils of triglycerides containing $C_{12}$ to $C_{14}$ or $C_{22}$ to $C_{24}$ fatty acids. The hard butters produced therefrom have excellent anti-blooming properties but are deficient in other properties, such as poor brittleness.

The method of hydrogenation used in most prior processes generally can be classified into two basic categories depending upon the iso-oleic acid content formed by the hydrogenation reaction. One method of hydrogenation, such as exemplified in U.S. Pat. Nos. 2,942,984 and 2,972,541 and British Pat. No. 1,219,245, involves promoting the formation of iso-oleic acid.

In the process described in U.S. Pat. No. 2,942,984, a certain class of natural fats or oils, namely, palm oil, shea butter, lard, beef tallow and mutton tallow, are first fractionated to obtain a liquid fraction which is hydrogenated in the presence of a nickel catalyst to produce a hard butter. The hard butter produced by this process requires tempering when used in the manufacturing of a confectionery because of an insufficient iso-oleic acid content.

In the processes described in U.S. Pat. No. 2,972,541 and British Pat. No. 1,219,245, hard butters are prepared from oils having higher iodine values, such as cotton seed oil and soy bean oil. However, the hydrogenation must be followed by fractionation which produces a relatively poor yield of the desired hard butter.

When a conventional nickel hydrogenation catalyst is used, even under so-called "selective conditions" (i.e. low hydrogen pressure and high catalyst concentration), it is more difficult to obtain elaidinization of fats having lower iodine value than with a fat having higher iodine values because the relative easiness of elaidinization is generally proportional to the magnitude of the iodine value. During the hydrogenation step in processes using a nickel catalyst, there is an unavoidable trans-isomerization of the double bonds of the raw fats or oils so long as the iodine values thereof are above 0. Hydrogenated products prepared from fats or oils having high iodine values have a higher trans-isomer content than those prepared from fats and oils having lower iodine value. However, it is well recognized that, after the trans-isomer content has reached a maximum during hydrogenation, the decrease in iodine value can result in a reduction in the trans-isomer content because a nickel catalyst can hydrogenate the trans-isomers. Thus, conventional nickel catalysts are generally inadequate for producing a hydrogenated product having a high trans-isomer content from oils or fats having low iodine value.

SUMMARY OF THE INVENTION

An object of this invention is to provide hard butters which have excellent resistance to fat bloom and good melting properties, are particularly useful as cocoa butter substitutes, and can be used without tempering.

Another object of this invention is to provide a process for making such hard butters.

Another object of this invention is to provide a process for hydrogenating fats and oils wherein the hydrogenation reaction can easily be controlled so as to prevent the over-absorption of hydrogen.

A further object of this invention is to provide a process for preparing hard butter wherein fats and oils are hydrogenated without causing the raw fats or oils to decompose and release free fatty acids.

A still further object of this invention is to provide a novel catalyst for hydrogenating fats and oils.

Other objects, aspects and advantages of this invention will become apparent upon reviewing the following detailed description and the appended claims.

According to this invention, a fat or oil having an idoine value in the range of 60 to 78 and a total content of linoleic and linolenic acids of less than 17 weight percent, calculated as the fatty acid, is hydrogenated with a nickel catalyst containing about 6 to 21 parts by weight sulfur per 100 parts of nickel until the absorption of hydrogen has substantially ceased. The hard butters produced in accordance with this invention have excellent resistance to fat bloom, have good melting properties, and can be used in the manufacture of chocolate and confectioneries, either as a substitute for cocoa butter or in admixture with cocoa butter, without tempering.

BRIEF DESCRIPTION OF THE DRAWING

The FIGURE illustrates the Solid Fat Content Index (SCI) curves for the hydrogenated products prepared in Example 5.

DESCRIPTION OF THE PREFERRED EMBODIMENTS

As mentioned above, the starting fats or oils used in this invention have an iodine value within the range of 60 to 78, preferably within the range of 65 to 73, and a total content of linoleic and linolenic acids (combined as constituents of triglycerides) of less than 17 weight percent, calculated as fatty acids. Fats or oils having iodine values less than 60 do not have sufficient double bonds to be isomerized during hydrogenation and contain tri-saturated glycerides which produce a waxy taste. On the other hand, fats or oils having iodine values greater than 78 contain too many double bonds to be isomerized during hydrogenation, causing isomerization to terminate before the desired hardening in the resultant product is produced. This incomplete isomerization also occurs when the starting oils or fats have a total content of linoleic and linolenic acids of more than 17 weight percent.

A wide variety of natural and synthetic fats or oils having these properties can be used. Representative examples of acceptable fats and oils include a refined oil or fat, such as lard; hydrogenated oils and fats prepared from oils having higher iodine values, such as soy bean oil, cotton seed oil, and olive oil; fractionated oils or fats prepared from palm oil or beef tallow; and synthetic fats or oils, such as those prepared by interesterifying soy bean oil or hydrogenated soy bean oil and palm oil or a palm oil fraction. In order to enhance the physical properties of and provide a higher transisomer content in the resultant hard butter product, the starting fat or oil preferably contains combined $C_{16}$ and/or $C_{18}$ fatty acids and, more preferably, contains about 25 to about 50 wt. % of combined $C_{16}$ fatty acids, based on the total combined fatty acids in the fat or oil.

The catalyst of this invention is a modified nickel catalyst containing from 6 to 21 parts by weight of sulfur per 100 parts of nickel and differs from a conventional nickel hydrogenation catalyst in its ability to promote trans-isomerization. That is, the catalyst of the invention does not substantially hydrogenate the trans-form double bonds, particularly those of elaidic acid. Accordingly, when the trans-isomer content of the hydrogenated fat or oil reaches a maximum during hydrogenation, hydrogen absorption substantially ceases.

The inclusion of catalytic poisons such as sulfur, selenium, nitrous oxide and sulfurous acid, by themselves in the hydrogenation reaction can cause cleavage of the glycerides from the starting oil and fat and/or impart an undesirable off-flavor to the resultant product. Quite unexpectedly then, the catalyst of this invention does not produce these undesirable results even though it contains such a poison, i.e. sulfur.

In order to provide the degree of hydrogenation required to produce the desired hard butter, it is essential that the sulfur content of the catalyst to be within the above defined range. If the sulfur content is less than 6 parts by weight per 100 parts of nickel, the catalyst is too active and will readily hydrogenate trans-oelic acid (elaidic acid) to stearic acid, thereby producing a resultant hydrogenated product having a relatively large amount of a high melting portion which causes a waxy taste. If the sulfur content is greater than 21 parts by weight per 100 parts of nickel, the catalyst is too inactive to produce the desired hydrogenation within a practical time period and can cause the starting fats or oils to decompose and release free fatty acids.

The catalyst of this invention can be prepared in any suitable manner. For example, it can be prepared by subjecting a conventional reduced nickel hydrogenation catalyst to an atmosphere containing hydrogen sulfide for a sufficient time to obtain the desired sulfur content. More practically, the catalyst can be prepared by subjecting a nickel compound, such as the oxides, hydroxides or carbonates thereof, to a reduction reaction, such as subjecting it to hydrogen gas under heating, and then placing in a mixed gas stream containing hydrogen and hydrogen sulfide until the desired sulfur poisoning is obtained. Preferably, the nickel compound is suspended in a carrier material, such as diatomaceous earth.

The amount of catalyst employed for the hydrogenation is in the range of about 0.1 to about 3, preferably about 0.3 to 1, weight percent, based on the total weight of the starting fat or oil. The hydrogenation temperature used should be in the range of about 160° to about 220°C., preferably about 180° to 195°C. Generally, when temperatures lower than about 160°C. are used, the hydrogenation proceeds at an impractically slow rate. At temperatures above about 220°C., the starting fat or oil is decomposed, causing the release of free fatty acids and an unpleasant odor.

The hydrogenation is continued until absorption of hydrogen substantially ceases. That is, the hydrogenation is decreasing until the iodine value of the hydrogenated product is decreased at a rate of about 1 per hour, preferably less than about 0.5 per hour. Since the catalyst of this invention does not hydrogenate transform double bonds, especially those of monoethenoic acid, the degree of hydrogenation is easily controlled and the over hydrogenation, i.e. over absorption of hydrogen, normally produced in prior art processes is prevented. The length of time for hydrogenation and the degree of hydrogenation depends to a large degree on the sulfur content of the catalyst and the iodine values of the starting fats or oils.

After completion of the desired hydrogenation, the reaction product is cooled below 80°C. and the catalyst is separated therefrom in a suitable manner. If desired, the hydrogenated product can be fractionated into three melting point portions in the usual manner with a solvent, such as methyl ethyl ketone, acetone, hexane, nitropropane, and the like, to obtain better hard butter. Since the hydrogenated product itself is suitable for hard butter, a higher yield of medium melting portion is obtained by fractionation. This fractionation is preferably carried out step wise, first cooling to 15° to 25°C. and then cooling 5° to −10°C.

The hard butter produced by this invention has superior melting properties and can be used to manufacture chocolate or the like without the necessity for tempering. Also, the hard butter exhibits excellent resistance to fat bloom, particularly when used in admixtures with cocoa butter.

Determination of Various Characteristics

As used herein, the trans-isomer content, solid fat content index and the melting point are determined in the following manner:

A. Trans-Isomer Content — Determined by A.O.C.S. Tentative Method Cd 14-61 and calculated as trielaidin.

B. Solid Fat Content Index (S.C.I.) — Determined by A.O.C.S. Tentative Method Cd 10-57 except the following sequential steps are used for conditioning the sample:

1. Transfer dilatometer containing the sample to a 0°C. bath and hold therein for 1 hour.
2. Transfer dilatometer to a 20°–23°C. bath and hold for 3 days.
3. Transfer dilatometer back to 0°C. bath and hold for over 1 hour.

C. Melting Point — Determine by A.O.C.S. Official Method Cc 3-25.

The following examples are presented to more fully illustrate this invention; however, it should be understood that they are not to be construed as limitations thereto.

ties to produce trans-isomerization from a starting oil having a low iodine value.

In another test, two separate hydrogenated fat samples having substantially the same iodine values and transisomer content were prepared. One sample was prepared from a soy bean oil using the conventional nickel catalyst identified in Table I and the other from a fractionated palm oil using the sulfur-containing catalyst prepared in Example 1. The thus-prepared hydrogenated fat were fractionated to obtain a medium melting portion. The results of this test are listed below in Table II.

TABLE II

| Starting Oil | | Hydrogenated Product | | | Fractionated Product | | | |
|---|---|---|---|---|---|---|---|---|
| Type | IV | IV | Trans-isomer Content, % | Melting point °C. | Portion [1] | Yield Wt. % | IV | Melting point, °C. |
| Soy Bean Oil | 133.2 | 57.8 | 57.5 | 51.2 | H | 31.5 | 38.6 | — |
| | | | | | M | 39.7 | 59.5 | 36.0 |
| | | | | | L | 28.8 | 77.6 | — |
| Fractionated Palm Oil | 70 | 56.7 | 60.1 | 35.9 | H | 8.1 | 40.2 | — |
| | | | | | M | 68.0 | 55.3 | 35.8 |
| | | | | | L | 23.9 | 66.2 | — |

[1] H, M, and L respectively designate high melting portion, medium melting portion, and low melting portion.

EXAMPLE 1

The catalyst according to this invention was prepared by reducing nickel oxide suspended in diatomaceous earth with a stream of hydrogen gas and then subsequently contacting it with a mixed gas stream containing hydrogen and hydrogen sulfide. The resultant catalyst contains 47 wt. % nickel, 5 wt. % sulfur and 48 wt. % of the carrier.

EXAMPLE 2

A series of tests were run to evaluate the importance of selecting the proper combination of the starting material and the catalyst in accordance with the process of this invention.

In one test, palm oil fractions having an iodine value of 62 were hydrogenated to varying degrees with a conventional nickel catalyst and with the catalyst prepared in Example 1. The iodine values and the trans-isomer content of the resultant hydrogenated products are listed below in Table I.

TABLE I

| Catalyst | Iodine Value | Trans-isomer content, percent as trielaidin |
|---|---|---|
| Conventional nickel catalyst [1] | 50.2 | 13.5 |
| do. | 46.5 | 16.2 |
| do. | 43.5 | 21.3 |
| Sulfur-containing nickel catalyst [2] | 56.1 | 35.0 |
| do. | 55.2 | 46.0 |
| do. | 54.0 | 51.8 |

[1] N-103, marketed by Nikki Kagaku Co., Ltd., Tokyo Japan
[2] Prepared in Example 1

From the results of this test, it can be seen there is a marked difference between a conventional nickel catalyst and a catalyst of this invention insofar as their abili- From the results of this test, it can be seen that, by proper selection of the starting material, hydrogenated products having similar iodine values and trans-isomer contents can be prepared by both catalysts. However, the fractionated palm oil hydrogenated in accordance with the process of this invention itself was acceptable for use as a hard butter while the soy bean oil hydrogenated with a conventional nickel catalyst could not be so used because of its waxy taste and high melting point. Furthermore, the yield of medium melting portion from the subsequent fractionation was only 39.7 wt. % for the hydrogenated soy bean oil while the yield for the palm oil hydrogenated in accordance with the invention was 68 wt. %, i.e., more than 1.7 times greater.

In a further test, the soy bean oil having an iodine value 133.2 was hydrogenated with the catalyst prepared in Example 1 until absorption of hydrogen had substantially ceased. The resultant hydrogenated product had an iodine value of 86 and a trans-isomer content (as trielaidin) of 88%, but had a melting point of less than 30°C., in which of course is below the level acceptable for a hard butter.

From the results of the above tests, it can be seen that the catalyst of this invention is capable of producing a hydrogenated product having high trans-isomer content. However, it can also be seen that, in order to obtain an acceptable hard butter, the starting fat or oil must have the proper iodine value.

EXAMPLE 3

700 g of a refined lard having an iodine value of 63 and a total content of combined linoleic and linolenic acids of 6.5 wt. % was hydrogenated at 185°C. in the presence of 2.8 g of the catalyst prepared in Example 1 and under a hydrogen gas atmosphere of 3 Kg/cm$^2$ gauge. Hydrogenation was continued for about 4 hours until the absorption of hydrogen had substantially ceased. After hydrogenation, the reaction product was cooled to 60°–70°C. and the catalyst removed by filtering after adding 15 g of bleching earth and stirring. The resultant hydrogenated fat had an iodine value of 54, a trans-isomer content of 51% and a melting point of 36.8°C. This fat was acceptable for use as a cocoa butter substitute in a manufacturing of confectioneries without tempering.

EXAMPLE 4

700 g of a refined soy bean oil having an iodine value of 131.2 was hydrogenated with the conventional nickel catalyst identified in Table I to decrease the iodine value thereof to 73.9. 500 g of the resultant hydrogenated soy bean oil and 140 g of a refined palm oil having an iodine value of 51 were mixed together and then reacted at 60° for 1 hour in the presence of 2 g of sodium methoxide to obtain an interesterified product which was refined in a conventional manner. The resultant oil, which had an iodine value of 69.2 and a total content of linoleic and linolenic acid of 8.5 wt. % was then hydrogenated with the catalyst prepared in Example 1 to produce a hard butter which was acceptable for use in the manufacture of confectionery.

EXAMPLE 5

A palm oil fraction having an iodine value of 69.4, a $C_{16}$ fatty acid content of 31 wt. %, and a $C_{18}$ fatty acid content of 67 wt. % (composed of 2.8% stearic acid, 48.6% oleic acid, and 15.6% linoleic acid) was prepared by fractionating a palm oil with methyl ethyl ketone at −4°C. 700 g of the thus-obtained fraction was hydrogenated at 190°C. in the presence of 4.2 g of the catalyst prepared in Example 1 and under a hydrogen gas atmosphere at 4 Kg/cm$^2$ gauge. Hydrogenation was continued until absorption of hydrogen had substantially ceased, i.e., until the rate of iodine value decrease per hour was 0.5. The resultant hydrogenated oil recovered from the reaction mixture had an iodine value of 56.4, a melting point of 35.8°C., a trans-isomer content (as trielidin) of 62% and the excellent melting properties indicated by S.C.I. curve A in the FIGURE.

This hydrogenated product was further fractionated to obtain a medium melting portion by dissolving a portion in a methyl ethyl ketone solvent containing 5 wt. % water and then cooling the solution to 20°C. to form a first crystallized portion. The first crystallized portion (high melting portion) was separated by filtering and the filtrate was then furthered cooled to −5°C. to form a second crystallized portion. The second crystallized portion (medium melting portion) was recovered by filtering. The thus-obtained medium melting portion had an iodine value of 55.5, a melting point of 35°C., a trans-isomer content (as trielaidin) of 66.1%, and the superior melting properties indicated by S.C.I. curve B in the FIGURE.

As a control, a portion of the above palm oil fraction was hydrogenated with the conventional nickel catalyst identified in Table I. The concentration of catalyst in the oil was 0.3 wt. %. The hydrogenation reaction was carried out at 180°C. and under atmosphere of hydrogen gas at a pressure of 2 Kg./cm$^2$ gauge until the iodine value of the product decreased to about 55. The resultant hydrogenated product had a melting point of 34°C., a trans-isomer content of 18.1% and the melting properties indicated by S.C.I. curve C. in the FIGURE.

From these results, it can be seen that hydrogenated products produced by the catalyst of this invention have melting properties which are markedly superior to hydrogenated products produced from the same starting oil by a conventional nickel catalyst.

EXAMPLE 6

1.4 Kg. bitter chocolate (containing 53 wt. % cocoa butter), 1.5 Kg. of whole milk powder, 4.2 Kg. of powdered sugar, and 2.9 Kg. of the hard butter of Example 5 (S.C.I. curve B) were mixed together and passed through a refiner-roll and subjected to a conching process in the usual manner used for the manufacture of a confectionery. The mixture was then poured into a casting mold at 40°C. without tempering and cooled to solidification. The resultant confectionery products were easily released from the molds and did not exhibit fat bloom after more than 6 months storage. On the other hand, products obtained from a process including a conventional tempering step at 30°C. or 35°C. were difficult to remove from the molds, had poor gloss retention, and exhibited fat bloom after relatively short storage periods.

EXAMPLE 7

Chocolate-like products were prepared with varying portions of the hard butter prepared in Example 5 substituted for cocoa butter. The products were stored at room temperature and were observed for the evidence of fat bloom. The results of these tests are listed below in Table III.

TABLE III

| Hard Butter From Example 5 | Proportion of Hard Butter and Cocoa Butter | Storage Time Before Evidence of Fat Bloom, months |
|---|---|---|
| SCI Cure B | 90:10 | more than 6 |
|  | 75:25 | more than 6 |
|  | 70:30 | 3–5 |
| SCI Cure A | 90:10 | more than 6 |
|  | 80:20 | more than 6 |
|  | 75:25 | 5–6 |

From these results, it can be seen that chocolate-like products having good resistant fat bloom can be made from mixtures containing large proportions of a hard butter prepared in accordance with the invention as substitutes for cocoa butter.

We claim:

1. A process for preparing a hard butter, which is suitable for use as a cocoa butter substitute in the manufacture of confectioneries without tempering, comprising hydrogenating a fat or oil having an iodine value within the range of 60 to 78 and a total linoleic acid and linolenic acid content of less than 17 weight %, based on the total weight of the oil or fat and calculated as the fatty acid; with a nickel catalyst containing 6 to 21 parts by weight sulfur per 100 parts of nickel until the absorption of hydrogen has substantially ceased.

2. A process according to claim 1 wherein the iodine value of said fat or oil is within the range of 65 to 73.

3. A process according to claim 1 wherein said hydrogenation is continued until the per hour rate of decrease in the iodine value of the reaction product is about 1.

4. A process according to claim 1 wherein said fat or oil includes combined $C_{16}$ fatty acids in an amount within the range of 25 to 50 weight %, based on the total combined fatty acids or said oil or fat.

5. A process according to claim 4 wherein said fat or oil is a palm oil fraction.

6. A process according to claim 4 wherein said fat or oil is prepared by an interesterification between palm oil or a palm oil fraction and soy bean oil or hydrogenated soy bean oil.

7. A process according to claim 1 further including solvent fractionating the resultant hydrogenated product to obtain a medium melting portion.

8. A process according to claim 7 wherein said fractionation is carried out in two steps, first cooling the solution to 15° to 25°C. and then cooling the solution to 5° to −10°C.

9. A process according to claim 1 wherein said catalyst is prepared by subjecting a reduced hydrogenation catalyst to an atmosphere containing hydrogen sulfide for a sufficient time to add the desired sulfur content thereto.

10. A process according to claim 1 wherein said catalyst is prepared by contacting a reduced nickel catalyst with a mixed gas stream containing hydrogen and hydrogen sulfide for a sufficient time to add the desired sulfur content thereto.

11. A hard butter prepared by the process of claim 1.

12. A hard butter prepared by the process of claim 7.

13. The process according to claim 1 wherein the amount of catalyst employed in within the range of about 0.1 to about 3 wt. %, based on the total weight of the starting fat or oil.

14. A process according to claim 13 wherein the hydrogenation is carried out at a temperature in the range of about 160° to about 220°C.

* * * * *